Nov. 21, 1967 H. T. KIFOR ET AL 3,353,769

SPRAY APPARATUS FOR USE WITH AIRCRAFT

Filed Sept. 10, 1965

INVENTORS
ORLEY R. BOURLAND JR.
HARRY T. KIFOR
BY H. H. Oldham
ATTORNEY United States Patent Office 3,353,769

Patented Nov. 21, 1967

3,353,769

SPRAY APPARATUS FOR USE WITH AIRCRAFT

Harry T. Kifor, Canton, Ohio, and Orley R. Bourland, Jr., Walkersville, Md.; said Kifor assignor to Goodyear Aerospace Corporation, Akron, Ohio, a corporation of Delaware, and said Bourland assignor to the United States of America as represented by the Secretary of the Army Filed Sept. 10, 1965, Ser. No. 486,441
7 Claims. (Cl. 244—136)

This invention relates to a spray apparatus particularly adapted for use with aircraft, and more specifically to a spray apparatus which can utilize standard 55-gallon drums alone or in combination according to the payload carrying weight of a particular aircraft.

Heretofore it has been known that there have been many and various ways to spray liquid from aircraft such as used in dusting crops with fertilizers or insecticides. Also, certain liquid spray systems are utilized in sky writing techniques. There may also be military applications for spraying liquids from aircraft, such as biological or chemical agents, defoliation materials, and the like. These prior art apparatus have been difficult to handle, complex, and relatively expensive since each system had to have a single tank designed completely for the particular aircraft to which it was associated. Further, the liquid utilized in these prior art systems also had to be carried separately in normal shipping barrels to be transferred in a suitable manner into the single tank of the system. Thus, the necessity for various size single tanks associated with elaborate spraying equipment is a costly, inflexible, and inefficient operation.

Therefore, it is the general object of the present invention to avoid and overcome the foregoing and other difficulties of/and objections to prior art practices by the provisions of a spray apparatus adapted for use with aircraft wherein standard 55-gallon drum liquid shipping containers are arranged in end-to-end relationship in selective numbers according to the payload carrying weight of the particular aircraft, with the containers themselves providing the carrying tank features.

A further object of the invention is to provide an improved spraying apparatus for association with aircraft where standard 55-gallon drum shipping containers are arranged in end to end relationship with aerodynamic fairing at each end thereof to provide aerodynamic stability, and associated with an air compression system to selectively force the liquid in the drums out discharge nozzles.

A further object of the invention is to provide a spraying apparatus for association with aircraft which is extremely simple, adaptable to aircraft of various payload capacities, inexpensive to manufacture, and extremely reliable in operation.

A further object of the invention is to provide a unique circular clamping ring for securing standard 55-gallon drum liquid shipping containers in aligned end to end relationship, with further connections to admit air pressure into the drums and discharge liquid therefrom in a spray.

A further object of the invention is to provide a spray apparatus for association with aircraft having an aerodynamically faired front end encapsulating a ram air turbine which provides the power to drive an air compressor, which air compressor thus provides the power to discharge liquid from the apparatus in a spray.

The aforesaid objects of the invention and other objects which will become apparent as the description proceeds are achieved by providing in a spray tank apparatus for use with aircraft, the combination of a plurality of separate 55-gallon liquid carrying drums, means to clamp the drums in end to end aligned relation, a propeller driven air compressor mounted in aerodynamically faired relation at one end of the aligned drums, means to selectively admit air from the compressor into the drums, nozzle means to discharge liquid from the drums when air is admitted thereinto, and aerodynamic stabilization fairing mounted at the other end of the drums.

For a better understanding of the invention, reference should be had to the accompanying drawings, wherein.

Figure 1:
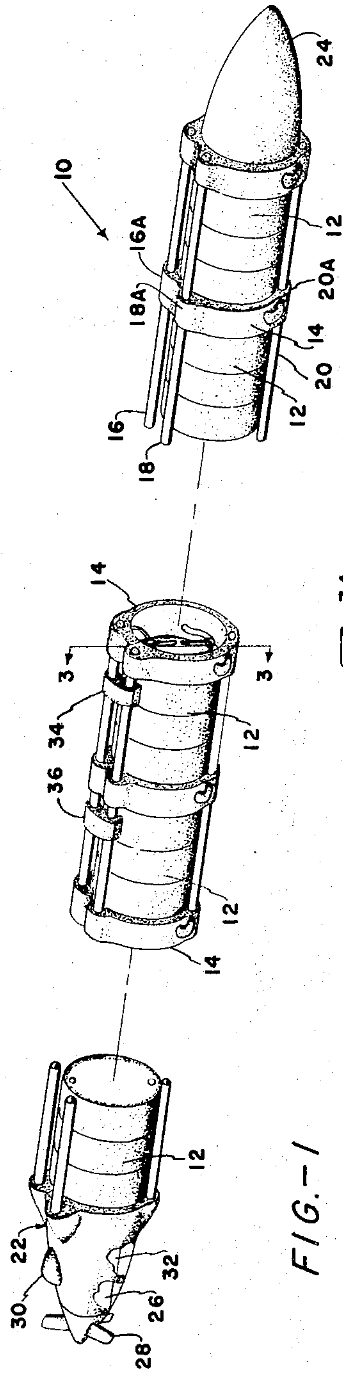
FIGURE 1 is an exploded perspective view of a preferred embodiment of the invention which combines five 55-gallon drums.

With reference to the form of the invention illustrated in FIGURE 1 of the drawings, the numeral 10 indicates generally a spray apparatus particularly designed for aircraft which basically comprises a plurality of standard 55-gallon drums, each indicated generally by the numeral 12, and held in aligned end to end relationship by a plurality of clamping rings 14. The clamping rings 14 are in turn supported along the top surface thereof by a pair of substantially parallel longitudinally directed structural tubular members 16 and 18 which are preferably broken into segmented sections and removably received in fluid tight relationship in respective raised flange portions 16A and 18A associated with each of the rings 14. Normally, these tube 16 and 18 will be in tension because they are in effect carrying the weight of the drums 12. In order to support the bottom side of the rings 14, a longitudinally extending tubular structural member 20 is provided in segmented fluid tight relationship to raised flanges 20A associated with each of the rings 14. Normally this bottom member 20 is designed for compression loads.

In order to provide proper aerodynamic flight characteristic to the apparatus 10, a forward fairing tank, indicated generally by the numeral 22 is mounted to the forward end of the aligned tanks 12, while a rear fairing tank 24 is mounted to the rearward end. Normally, these tanks 22 and 24 are lightweight and easily connected to the appropriate structural frame members 16, 18 and 20, and the respective ring 14.

As a means for making the apparatus 10 essentially self contained and not reliable on any aircraft system, a ram air turbine 26 is mounted within the front fairing 22, to be driven by air striking a propeller 28, as the aircraft carrying the apparatus moves through the air and utilizing a scoop type air injection 30, all in the usual manner. The turbine 26 is utilized to drive a conventional air compressor 32, which generally is also mounted within the front fairing tank 22. The invention contemplates that the air output from the compressor 32 will be fed into one or both of the top tubular structural members 16 and 18.

In order to mount the entire apparatus 10 in its assembled condition to an aircraft, a pair of mounting blocks 34 and 36 are appropriately received on the structural members 16 and 18 at the center of gravity of the assembly which is about the mid section of the entire apparatus 10. These blocks 34 and 36 may carry appropriate pad eyes or other mounting supports to be received in complementary mounted relationship beneath the wing, body, or fuselage section of an aircraft.

Figure 2:
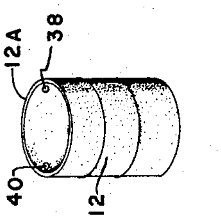
FIGURE 2 is a slightly enlarged perspective view of one of the standard 55-gallon shipping drums utilized in the combination of FIGURE 1.

FIGURE 2 represents one of the drums 12 of FIGURE 1 in a detached condition and shows openings 38 and 40 on one end thereof. Normally in drums of this type, the openings 38 and 40 will be covered by some appropriate screw out or knock out closure means. The opening 40 will normally be the pour opening for the liquid contained in the drum 12 while the opening 38 will allow air to replace the liquid as it is removed, thus preventing a vacuum which retards the flow of the fluid out of the drum or collapses the drum. Each drum has a raised lip 12A around each end thereof, all in the usual manner.

Figure 3:
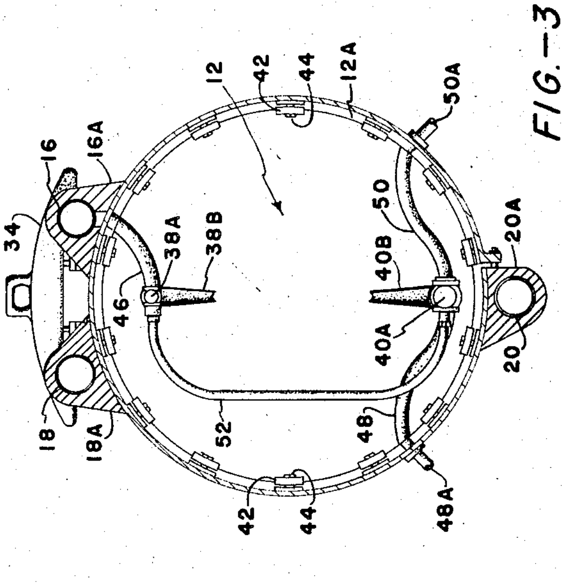
FIGURE 3 is an enlarged vertical cross sectional view of one of the clamping rings taken on line 3—3 of FIGURE 1.

One of the essential structural components of the invention is in the circular shaped clamping rings 14. FIGURE 3 illustrates in enlarged vertical cross section a typical ring 14. Note the relationship of the tubular structural members 16, 18 and 20 with respect to the raised flanges 16A, 18A and 20A, respectively. A plurality of small arc shaped bracket clamps 42, held in place by appropriate bolts 44, are utilized to hold the lip 12A of respective drums 12 in fixed relationship relative to their appropriate clamping ring 14. Each of the openings 38 and 40 is provided with a positive opening and closing valve 38A and 40A, which are controlled by handles 38B and 40B, respectively. In this particular instance, the tubular structural member 16 carries the air pressure flow from the compressor 32 and is connected to the valve 38A by an appropriate flexible rubber connecting tube 46. When the valve 38A is opened, air pressure from the member 16 is passed through the line 46 and into the drum 12. The invention contemplates that whenever the valve 38A is opened, the corresponding valve 40A must be also opened, so that the air pressure admitted into the drum forces the fluid or liquid in the drum out through the valve 40A and in substantially equal amounts through flexible rubber discharge hoses 48 and 50 and thus to respective nozzles 48A and 50A. Naturally, the actual opening and closing of the valves 38A and 40A may be appropriately controlled from the cockpit of the aircraft to thereby control when spraying will take place. In the same manner, the rotative action of the ram air turbine 26 and propeller 28 may be controlled from the aircraft cabin to prevent wear and tear on these parts during routine flying operation of the aircraft.

If it is desired to simplify controls, the valve 40A may be air actuated from a flexible rubber hose 52 connected to the valve 38A, thus automatically insuring positive opening operation of the valve 40A when the valve 38A is actuated and receiving air under pressure. A similar automatic operation of the two valves will occur upon closing.

Thus, it should be understood that the spraying apparatus 10 is completely flexible in that any number of 55 gallon drums 12 may be incorporated in the overall combination, this number being dependent upon the payload carrying weight of the particular aircraft. Each drum may be easily added by utilizing another appropriate clamping ring 14 with the associated structural carrying tubes 16, 18 and 20. Naturally, the front fairing tank 22 and rearward fairing tank 24 will always be incorporated regardless of the number of drums 12. The lifting blocks 34 and 36 will always be mounted about the center of longitudinal balance of the combined apparatus. It is thus seen that a very simple, highly flexible, yet inexpensive spraying apparatus has been shown and described which will reduce costs, logistics, and the complexity concerning the problems of transporting large quantities of fuel, water, herbicides, insecticides, fertilizers, biological and chemical agents, etc. while permitting payloads to be built up to match the aircraft payload capability, thereby eliminating the requirements for various size single tanks. The existing openings in standard 55-gallon liquid carrying drums are utilized with the insertion of valves 38A and 40A thereinto. The flexible tubing associated with the valves readily permits adjustability in this operation. The spraying is readily controlled from the aircraft cabin by controlling the actuation of the valves, as well as the operation of the ram air turbine.

Even though the invention has been described as being specifically designed for 55-gallon shipping drums, it should be understood that drums of any size, or shape may be utilized in this concept. It should be understood that while the valves 38A and 40A associated with each respective drum may be energized separately so that the contents of each drum may be selectively discharged, the invention contemplates that all valves will be opened simultaneously so there is a uniform discharge from all drums to thereby insure a balanced load on the aircraft at all times. If the use of separate nozzles 48A and 50A with each ring 14 is not desirable, the bottom support member 20 may receive the fluid discharge and act as a header with an appropriate discharge nozzle associated therewith.

While in accordance with the Patent Statutes only one best known embodiment of the invention has been illustrated and described in detail, it is to be particularly understood that the invention is not limited thereto or thereby, but that the inventive scope is defined in the appended claims.

What is claimed is:

1. In a spray tank apparatus for use with aircraft, the combination of
   - a plurality of cylindrically shaped tank drum shipping containers for liquid,
   - circular ring means clamping the containers in aligned end to end relationship,
   - frame means connecting and supporting the ring means,
   - an aerodynamically faired ram air turbine connected to the frame means at one end of the aligned containers, and driven by passing through the earth's atmosphere,
   - an air compressor mounted in aerodynamically faired relation to the turbine and driven thereby,
   - means to selectively introduce the air produced by the compressor into the containers,
   - spray nozzles associated with each container and coordinated with the selective introduction of air into the respective containers to discharge liquid from the containers in a spray, and
   - aerodynamic fairing means connected to the other end of the aligned containers to stabilize the aerodynamic flight characteristics of the apparatus.

2. A spray tank apparatus according to claim 1 where at least a portion of the frame means acts as a header to transmit the air from the air compressor, and operates in conjunction with the means to selectively introduce the air produced by the compressor into the containers.

3. An apparatus according to claim 1 where the circular ring means have valves associated in flexible relationship therewith for connecting the air from the compressor to the containers, and the spray nozzles to the containers.

4. In a spray tank apparatus for use with aircraft the combination of
   - a plurality of separate 55-gallon liquid carrying drums, frame means to clamp the drums in end to end aligned relation,
   - a propeller driven air compressor mounted in aerodynamically faired relationship to the frame means at one end of the aligned drums,
   - means to selectively admit air from the compressor into the drums,
   - nozzle means to discharge liquid in a spray from the drums when air is admitted thereto, and
   - aerodynamic stabilization fairing mounted at the other end of the drums.

5. In a spray tank apparatus for use with aircraft, the combination of
   - a plurality of similar drum shipping containers for liquid,
   - ring means clamping the containers in aligned end to end relationship,
   - frame means connecting and supporting the ring means,
   - an aerodynamically faired ram air turbine driven by passing through the earth's atmosphere connected to the frame means at one end of the aligned containers,
   - an air compressor mounted in aerodynamically faired relation to the turbine and driven thereby, pipe means connecting the air output of the compressor to the ring means, valve means controlling the flow of the air output of the compressor from the ring means into the containers, spray nozzles associated with each container and coordinated with the flow of air into the respective containers to discharge liquid from the containers in a spray, and aerodynamic fairing means connected to the frame means at the other end of the aligned containers to stabilize the aerodynamic flight characteristics of the apparatus.

6. An apparatus according to claim 5 where separate valve means also connect the liquid output of the containers to the nozzle and where all the valve means are mounted in flexible and adjustable relationship to the ring means.

7. In a spray tank apparatus for use with aircraft the combination of a plurality of separate 55 gallon liquid carrying drums, frame means to clamp the drums in end to end aligned relation, a propeller driven air compressor mounted in aerodynamically faired relationship to the frame means at one end of the aligned drums, valve means to control the admission of air from the compressor into the drums, nozzle means to discharge liquid in a spray from the drums when air is admitted thereto, aerodynamic stabilization fairing mounted at the other end of the drums, and mounting means at about the longitudinal center of balance of the combination.

References Cited

UNITED STATES PATENTS 3,061,247 10/1962 Hyde ---------------- 244—136

MILTON BUCHLER, *Primary Examiner.*

B. BELKIN, *Assistant Examiner.*